United States Patent Office 3,226,305
Patented Dec. 28, 1965

3,226,305
BIOLOGICAL TRANSFORMATION OF 1,3,10,11,12-PENTAHYDROXYNAPHTHACENE - 2 - CARBOXAMIDES TO TETRACYCLINE ANTIBIOTICS
Jerry Robert Daniel McCormick, Spring Valley, N.Y., Newell Oscar Sjolander, Saddle River, N.J., and Sylvia Jennie Johnson, Pearl River, N.Y., assignors to American Cyanamid Company, Stamford, Conn., a corporation of Maine
No Drawing. Filed Jan. 8, 1965, Ser. No. 424,205
20 Claims. (Cl. 195—80)

This application is a continuation-in-part of our co-pending application Serial No. 329,967, filed December 12, 1963, and now abandoned, which in turn is a continuation-in-part of our application Serial No. 233,945, filed October 29, 1962, now abandoned.

This invention relates to a new process for producing tetracyclines and, more particularly, is concerned with a novel process for biologically transforming 1,3,10,11,12-pentahydroxynaphthacene-2-carboxamides to tetracyclines as set forth in the following reaction scheme:

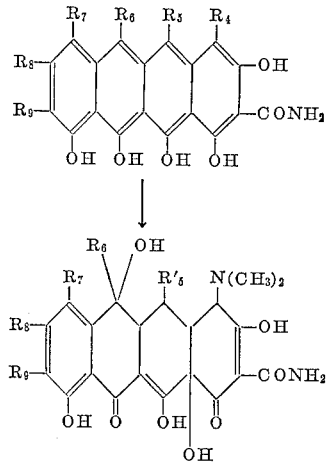

wherein $R_4$ is hydrogen, hydroxy or dimethylamino, $R_5$ is hydrogen, lower alkoxy or lower alkyl, $R'_5$ is hydrogen, hydroxy, lower alkoxy or lower alkyl, $R_6$ is hydrogen or lower alkyl, and $R_7$, $R_8$ and $R_9$ are each selected from the group consisting of hydrogen, halogen, hydroxy, lower alkoxy, lower alkyl, amino, mono(lower alkyl)amino, di(lower alkyl)amino, nitro, nitroso, thiocyano and mercapto. Lower alkyl and lower alkoxy groups contemplated by the present invention are those having from one to six carbon atoms. Halogen is exemplified by chlorine, bromine, iodine and fluorine.

For convenience, 1,3,10,11,12-pentahydroxynaphthacene-2-carboxamide has been designated by us as "Pretetramid." Thus, the substituted 1,3,10,11,12-pentahydroxynaphthacene-2-carboxamides, the starting materials for the novel process of the present invention, may be conveniently named as derivatives of "Pretetramid." For example, 6-methyl - 1,3,10,11,12 - pentahydroxynaphthacene-2-carboxamide, 7-chloro-1,3,10,11,12-pentahydroxynaphthacene-2-carboxamide and 4-dimethylamino-1,3,10,11,12-pentahydroxynaphthacene-2-carboxamide may be more conveniently referred to as 6-methylpretetramid, 7-chloropretetramid, and 4-dimethylaminopretetramid, respectively.

Our invention is based upon the discovery that it is possible to effect the biological transformation of pretetramids to tetracyclines. The method of the present invention, in its broader aspects, comprises the biological hydration at the 5a,6- and 4a,12a-positions of the pretetramids. Another way of expressing the result of the process of the present invention is to say that it comprises the net addition of two moles of water, one mole at the 5a,6-position and the other at the 4a,12a-position. This transformation is accomplished by adding a substituted pretetramid, or pretetramid itself, to a fermentation medium inoculated with a strain of a species of the genus Streptomyces, which species is capable of producing one of the tetracyclines. Certain other biological transformations may be accomplished simultaneously with the 5a,6- and 4a,12a-dihydration of the pretetramids. For example, where $R_4$ in the reaction scheme set forth above is hydrogen or hydroxy, then any of the above indicated Streptomyces will introduce a dimethylamino group at the 4-position of the pretetramid. Where $R_4$ is dimethylamino, then this substituent is retained at the 4-position regardless of the biological transformations occurring in the rest of the pretetramid molecule. Where $R_5$ in the above reaction scheme is hydrogen and a 5-hydroxylating species of the genus Streptomyces is employed, then a hydroxyl group is introduced at the 5-position. Where $R_5$ is lower alkyl, or where $R_5$ is hydrogen and a non-5-hydroxylating species of the genus Streptomyces is employed, then $R'_5$ is lower alkyl or hydrogen, respectively. Where $R_7$ is the above reaction scheme is a substituent other than hydrogen, then this substituent is retained at the 7-position regardless of the biological transformation occurring in the rest of the pretetramid molecule. Where $R_7$ is hydrogen, and a non-halogenating strain of Streptomyces is employed, then $R_7$ is also hydrogen in the product. Where $R_7$ in the pretetramid molecule is hydrogen, and a 7-halogenating strain of the genus Streptomyces is employed, then $R_7$ in the product is chlorine or bromine depending upon the conditions of the fermentation. Among the strains of S. aureofaciens which will introduce chlorine or bromine at the 7-position of the pretetramid molecule, as well as accomplishing the 5a,6- and 4a,12a-dihydration and the introduction of the dimethylamino group when $R_4$ is hydrogen or hydroxyl, are the following:

S. aureofaciens:

| | |
|---|---|
| ATCC 10762a | ATCC 12554 |
| ATCC 10762b | ATCC 13189 |
| ATCC 10762g | ATCC 13899 |
| ATCC 10762i | ATCC 13900 |
| ATCC 11989 | NRRL B–1286 |
| ATCC 12416b | NRRL B–1287 |
| ATCC 12416c | NRRL B–1288 |
| ATCC 12416d | NRRL B–2209 |
| ATCC 12551 | NRRL B–2406 |
| ATCC 12552 | NRRL B–2407 |
| ATCC 12553 | NRRL 3013 |

A representative strain of the genus Streptomyces which is a non-halogenating strain, that is, which will not introduce halogen at the 7-position of the pretetramid molecule, but which will accomplish the 5a,6- and 4a,12a-dihydration and the introduction of the dimethylamino group when $R_4$ is hydrogen or hydroxyl, is S. aureofaciens NRRL 3014. Representative strains of the genus Streptomyces which are non-halogenating strains but which will introduce a hydroxy group at the 5-position of the pretetramid molecule, in addition to accomplishing the 5a,6- and 4a,12a-dihydration and the introduction of the 4-dimethylamino group when $R_4$ is hydrogen or hydroxyl, are S. rimosus NRRL 2234, S. Platenis NRRL 2364 and S. hygroscopicus NRRL 3015.

Representative pretetramids which may be biologically transformed by the method of the present invention with a non-halogenating strain of the genus Streptomyces are, for example, (1) pretetramide, (2) 4-dimethylaminopretetramid, and (3) 6-methyl-4-dimethylaminopretetramid whereby there is obtained (1) 6-demethyltetracycline, (2)

6-demethyltetracycline, and (3) tetracycline, respectively. Representative pretetramids which may be biologically transformed by the method of the present invention with a 7-halogenating strain of the genus Streptomyces are, for example, (1) pretetramid, (2) 6-methylpretetramid, (3) 4-dimethylaminopretetramid, and (4) 6-methyl-4-dimethylaminopretetramid whereby there is obtained (1) 7-chloro-6-demethyltetracycline, (2) 7-chlorotetracycline, (3) 7-chloro-6-demethyltetracycline, and (4) 7-chlorotetracycline, respectively. A representative pretetramid which may be biologically transformed by the method of the present invention with a 5-hydroxylating strain of the genus Streptomyces is 6-methylpretetramid whereby there is obtained 5-hydroxytetracycline.

Iti s most surprising that the pretetramids can serve as substrates which can be acted upon by the microorganism so as to transform the pretetramids to tetracyclines. In the normal fermentation, the ingredients of the nutrient medium serve as the substrate from which the antibiotic is synthesized. It is unexpected to discover that chemical compounds as structurally stable as the pretetramids may serve as the substrates for producing various tetracyclines.

The conditions of the fermentation for the biological conversion of the pretetramids to tetracyclines are generally the same as set forth in U.S. Patent 2,482,055 to Duggar, U.S. Patent 2,734,018 to Minieri et al. and U.S. Patent 2,878,289 to McCormick et al. and which, in turn, are generally the same as for the presently known methods for producing various tetracyclines by fermentation. That is, the fermentation medium contains the usual nutrients and mineral substances. Suitable nutrients include any assimilable source of carbon, such as the polysaccharides or starches, or polyalcohols such as glycerol may be used. An assimilable source of nitrogen may be supplied through the use of proteins, protein hydrolysates, urea, corn steep liquor, meat extracts, peptone, distillers solubles, fish meal and other conventional substances. The common anions and cations are supplied in the form of their non-toxic salts. Trace elements such as manganese, cobolt, zinc, copper, etc., are obtained either as impurities in the above compounds, or through the use of tap water or by specifically adding solutions especially enriched with these trace elements.

The other general conditions of the fermentation such as hydrogen ion concentration, temperature, time, rate of aeration, preparation of the inoculum, sterilization, inoculation and the like are conventional and are similar to those for the production of other tetracyclines as set forth in the aforementioned U.S. patents to Duggar, Minieri et al. and McCormick et al.

When a 7-halogenating strain of the genus Streptomyces is employed with a pretetramid wherein $R_7$ is hydrogen, it is necessary only to modify the fermentation medium so that it contains at least 10 parts per million and preferably 1000–1500 parts per million of chloride ions as the sole halide ion when the 7-chloro substituent is desired, or a like amount of bromide ions as the sole halide ion when the 7-bromo substituent is desired.

After the fermentation has been continued for a suitable time, for example, from 12 to 96 hours, and the transformation of the pretetramid compound to the desired tetracycline is substantially complete, the tetracycline product may be isolated from the fermentation mash in any convenient manner. The isolation process may be selected from any of the numerous isolation techniques now well known in the art.

The pretetramid starting material may be added at any desired concentration, although for practical reasons a pretetramid substrate at a concentration of up to about 10 grams per liter of medium is satisfactory although higher concentrations may be used with some sacrifice in yield. The addition of the pretetramid starting material may be accomplished in any suitable manner so long as it promotes contact of the pretetramid with the biological medium. To this end, it is preferred to add the pretetramid starting material in a solvent such as dimethylformamide, dimethylacetamide, dimethylsulfoxide, tetramethylenesulfoxide and N-methylpyrrolidone. However, dimethylsulfoxide is preferred and a solution of magnesium acetate in dimethylsulfoxide is the most preferred solvent for the pretetramid starting material. Solutions of the pretetramids must be protected from air as the compounds are readily oxidized in solution.

The pretetramids, the starting materials for the novel process of the present invention, may be readily prepared in a variety of different ways. For example, the condensation of an appropriately substituted 3-hydroxyphthalic anhydride with an appropriately substituted 1,3-dihydroxynaphthalene-2-carboxamide gives rise either to an intermediate 6-hydroxynaphthacene-5,12-quinone or to an intermediate naphthacene-6,11-quinone as set forth in the following reaction scheme:

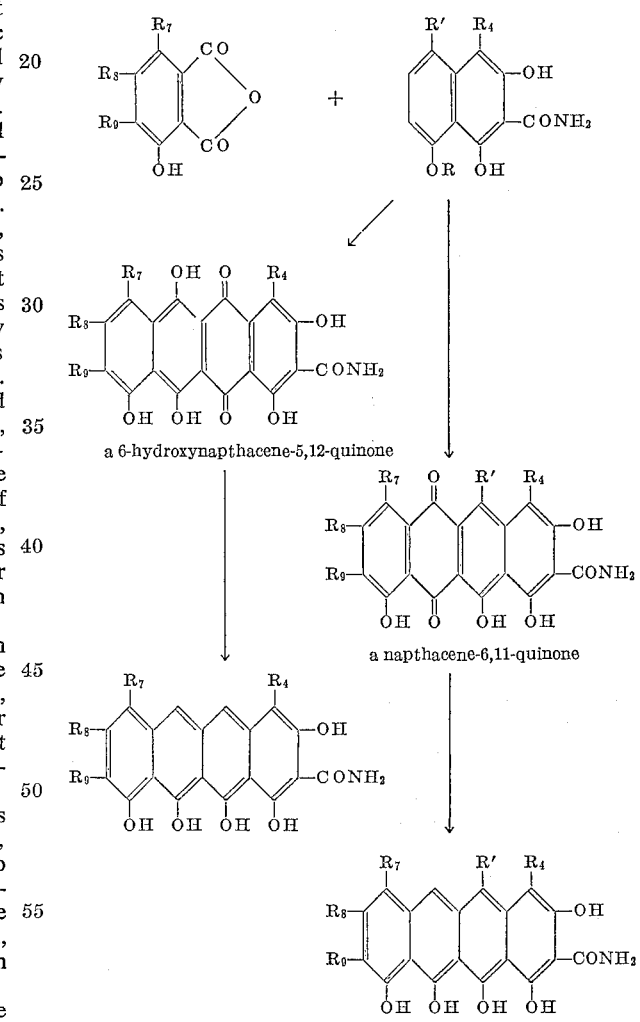

a 6-hydroxynapthacene-5,12-quinone a napthacene-6,11-quinone wherein $R_4$, $R_7$, $R_8$ and $R_9$ are as previously defined and R is hydrogen or lower alkyl. When R' is hydroxy or lower alkoxy, then the intermediate 6-hydroxynaphthacene-5,12-quinone is obtained. When R' is hydrogen or lower alkyl, then the product is a naphthacene-6,11-quinone. This condensation is carried out under the general conditions of the Friedel-Crafts reaction employing, for example, boric anhydride, sulfuric acid, anhydrous aluminum chloride or anhydrous ferric chloride as catalyst. The condensation may be carried out in a high boiling inert solvent, or in a melt such as boric anhydride or the eutectic of sodium chloride and aluminum chloride at temperatures in excess of 100° C. Reduction of the resulting naphthacenequinones to the corresponding 5,6-deoxygenated derivatives may be readily accomplished by any of several well-known procedures described in the chemical literature for the reduction of 1-hydroxyanthraquinones to the corresponding 9-anthrones. For example, this reduction may be accomplished with boiling hydriodic acid, with tin and hydrochloric acid, or by catalytic hydrogenation with a nickel or noble metal catalyst.

The pretetramids may also be prepared by the condensation of an appropriately substituted 3,7-dihydroxyphthalide with an appropriately substituted 1,3-dihydroxynaphthalene-2-carboxamide as set forth in the following reaction scheme:

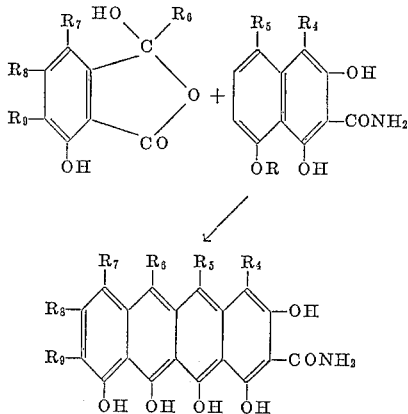

wherein $R_4$, $R_5$, $R_6$, $R_7$, $R_8$ and $R_9$ are as previously defined and R is hydrogen or lower alkyl. This condensation may also be carried out under the general conditions of the Friedel-Crafts reaction as described above for the condensation with 3-hydroxyphthalic anhydrides.

Certain of the pretetramids may also be obtained by stepwise dehydration of various tetracycline antibiotics as set forth in the following reaction scheme:

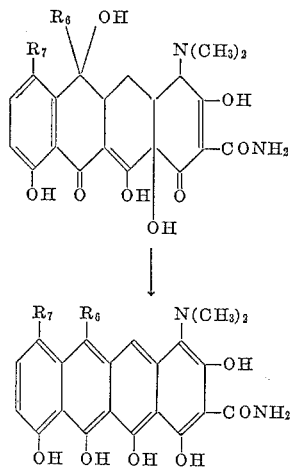

wherein, for example, $R_6$ is hydrogen or methyl and $R_7$ is hydrogen, chlorine or bromine. This stepwise dehydration to the 4-dimethylaminopretetramids may be accomplished by converting the antibiotic to the 12a-O-formate derivative with acetic-formic anhydride in pyridine. The 12a-O-formate derivative may then be pyrolyzed, with boiling xylene for example, to the 4a,12a-anhydro derivative which in turn may be further dehydrated by standard methods to the desired pretetramid. In this manner, 6-demethyltetracycline and 7-chloro-6-demethyltetracycline may be converted to 4-dimethylaminopretetramid and 7-chloro-4-dimethylaminopretetramid, respectively. Similarly, tetracycline and 7-chlorotetracycline may be converted to 6-methyl-4-dimethylaminopretetramid and 7-chloro-6-methyl-4-dimethylaminopretetramid, respectively.

Certain of the pretetramids may also be prepared by the condensation of an appropriately substituted naphthalene with 2-carboxamido-3,5,6-trihydroxy phthalic anhydride as set forth in the following reaction scheme:

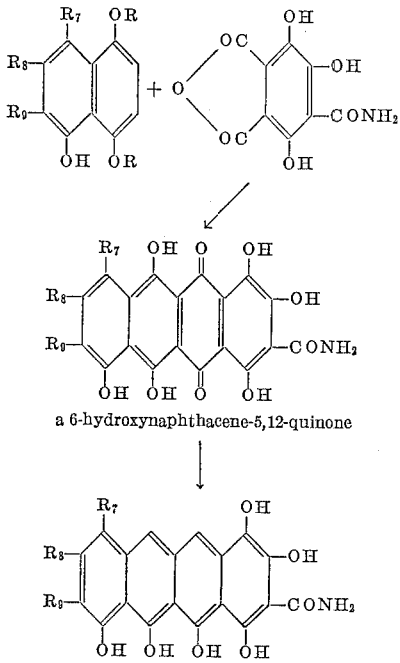

a 6-hydroxynaphthacene-5,12-quinone wherein $R_7$, $R_8$ and $R_9$ are as previously defined and R is hydrogen or lower alkyl. This condensation may also be carried out under the general conditions of the Friedel-Crafts reaction as described above, and reduction of the intermediate 6-hydroxynaphthacene-5,12-quinones may also be accomplished as set forth above. In preparing the pretetramids by the condensation reactions set forth above, it is to be understood that the substituted phthalic acids, esters, and acid halides are equivalent to the corresponding substituted phthalic anhydrides.

Certain of the pretetramids may be prepared from an appropriately substituted tetracycline methyl betaine [J.A.C.S. 80, 1654–1657 (1958)] as set forth in the following reaction scheme:

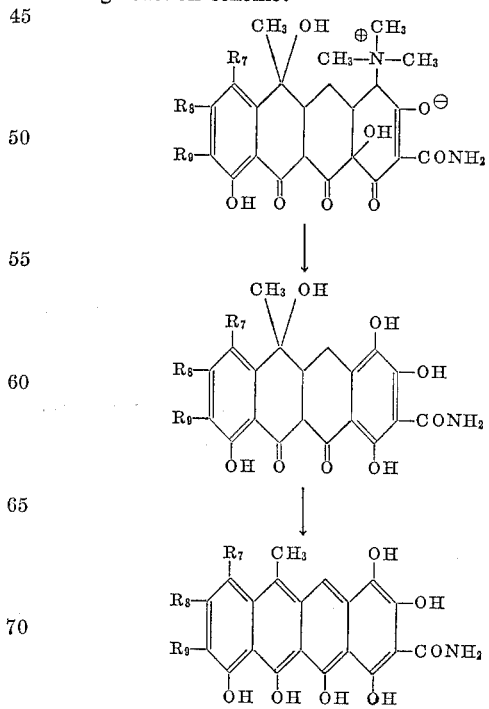

wherein $R_7$, $R_8$ and $R_9$ are as previously defined. The conversion of the tetracycline methyl betaine to the 4- dedimethylamino-4-hydroxy-4a,12a-anhydrotetracycline is carried out in refluxing acetonitrile under an atmosphere of nitrogen for 1½ to 2 hours. After this reaction is complete, the solvent is evaporated to dryness and the product is refluxed in a 30% solution of hydrobromic acid in acetic acid whereby the 1,3,4,10,11,12-hexahydroxynaphthacene-2-carboxamide is obtained.

The invention will be described in greater detail in conjunction with the following specific examples.

EXAMPLE 1

*Synthesis of 1,3,6,10,11-pentahydroxynaphthacene-5,12-quinone-2-carboxamide and conversion to pretetramid*

To 615 mg. of 1,3 - dihydroxy - 5,8 - dimethoxynaphthalene - 2 - carboxamide was added 385 mg. of 3-hydroxyphthalic anhydride, 2 grams of sodium chloride and 10 grams of anhydrous aluminum chloride. The solids were mixed thoroughly in a mortar and added to a flask which was set in an oil bath preheated to 200° C. The reaction was allowed to proceed for 2 hours. The melt was allowed to cool and was then digested cautiously with 50 ml. of 6 N HCl on a steam bath. The crude 1,3,6,10,11-pentahydroxynaphthacene - 5,12-quinone - 2 - carboxamide was collected by filtration, washed and then dried under vacuum. This crude quinone was then purified by extraction into chloroform from a dimethylformamide-water-triethylamine solution. The yield was about 172 mg. of 1,3,6,10,11-pentahydroxynaphthacene - 5,12 - quinone - 2 - carboxamide. This purified quinone was dissolved in 5 ml. of p-chlorophenol. To this was added 2 ml. of constant boiling hydriodic acid and 200 mg. of potassium hypophosphite. This mixture was refluxed for 5 hours, allowed to cool and then filtered. The crystalline pretetramid was washed with water, acetone, and then ether and dried under vacuum. The yield was 97 mg. of pretetramid.

EXAMPLE 2

*Conversion of 6-demethyltetracycline to 4-dimethylaminopretetramid*

One gram of 6-demethyltetracycline was dissolved in 10 ml. of pyridine. To this solution was added 3 ml. of acetic-formic anhydride reagent [1 volume of acetic anhydride plus 0.5 volumes of formic acid (98+%) slight warmed and cooled to room temperature before use]. The mixture was allowed to remain at room temperature for 15 minutes and then the solvents were removed in vacuo on a rotary evaporator. To the residue (6-demethyl-12a-O-formyltetracycline) was added 700 ml. of xylene. This mixture was distilled slowly over a period of 2 hours, during which time 200 ml. of distillate had been removed. The hot xylene solution was filtered. The filtrate was dried down to a residue by vacuum distillation. The residue (6-demethyl-4a,12a-anhydrotetracycline) was dissolved in 100 ml. of n-butanol containing 3 ml. of concentrated hydrochloric acid and the mixture was heated on a steam bath under nitrogen for 2 hours. The mixture was cooled and filtered. The crystalline product, 4-dimethylaminopretetramid, was washed with n-butanol and ether and dried under vacuum at 40° C. The yield was 300 mg.

EXAMPLE 3

*Conversion of 7-chloro-6-demethyltetracycline to 7-chloro-4-dimethylaminopretetramid*

One gram of 7-chloro-6-demethyltetracycline was dissolved in 10 ml. of pyridine. The solution was treated exactly as in Example 2 resulting in the successive formation of 7-chloro-6-demethyl-12a-O-formyltetracycline, 7-chloro-6-demethyl-4a,12a-anhydrotetracycline, and finally the crystalline product, 7-chloro-4-dimethylaminopretetramid. The yield was about 300 mg.

EXAMPLE 4

*Conversion of tetracycline to 4-dimethylamino-6-methylpretetramid*

One gram of tetracycline was dissolved in 10 ml. of pyridine. The solution was treated exactly as in Example 2 resulting in the successive formation of 12a-O-formyltetracycline, 4a,12a-anhydrotetracycline, and finally the crystalline product, 4-dimethylamino-6-methylpretetramid. The yield was about 500 mg.

EXAMPLE 5

*Biological conversion of pretetramid (1,3,10,11,12-pentahydroxynaphthacene-2-carboxamide) to 6-demethyltetracycline utilizing S. aureofaciens NRRL 3014*

Spores of non-chlorinating *S. aureofaciens* NRRL 3014 were washed from an agar slant with sterile distilled water to form a suspension containing $60-80 \times 10^6$ spores per ml. A 0.33 ml. portion of this suspension was used to inoculate an 8 inch test tube containing 8 ml. of a medium prepared according to the following formulation:

| | Grams |
|---|---|
| Sucrose | 30 |
| Ammonium sulfate | 2 |
| Calcium carbonate | 7 |
| Cornsteep liquor | 20 |
| Tap Water, q.s. to 1000 milliliters. | |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute, whereby an inoculum of the *S. aureofaciens* was obtained. A fermentation medium of the following composition was prepared:

| | | |
|---|---|---|
| $(NH_4)_2SO_4$ | grams | 6.7 |
| $CaCO_3$ | do | 9.0 |
| $CoCl_2 \cdot 6H_2O$ | milligrams | 5.0 |
| $NH_4Cl$ | grams | 2.0 |
| $MnSO_4$ (70% Technical Grade) | do | 0.10 |
| Cornsteep Liquor | do | 25.0 |
| Starch | do | 52.5 |
| Corn Flour | do | 14.5 |
| Tap Water, q.s. to 1000 milliliters. | | |

After sterilization of this medium in an autoclave for 20 minutes at a pressure of 15 pounds per square inch, 25 ml. portions in 250 ml. Erlenmeyer flasks were inoculated with 1.0 ml. portions of the *S. aureofaciens* inoculum. The fermentation was carried out at 25° C. for 24 hours on a rotary shaker operating at 180 revolutions per minute. At this time each mash portion was transferred to an individual flask containing a solution of 10 mg. of pretetramid in 1 ml. of dimethylsulfoxide. The fermentation was then continued on the rotary shaker for an additional 96 hours at 25° C. At this time analysis of the mash showed the presence of 15 micrograms per ml. of 6-demethyltetracycline. A control flask run in exactly the same manner but omitting the pretetramid showed no 6-demethyltetracycline.

EXAMPLE 6

*Biological conversion of pretetramid (1,3,10,11,12-pentahydroxynaphthacene-2-carboxamide) to 7-chloro-6-demethyltetracycline utilizing S. aureofaciens NRRL 3013*

The procedure of Example 5 was followed with the following exceptions: A partially fermented mash of chlorinating *S. aureofaciens* NRRL 3013 was transferred to individual flasks containing a solution of 11.4 mg. of pretetramid in a mixture of 10 mg. of magnesium acetate and 1 ml. of dimethylsulfoxide. The fermentation was then continued on the rotary shaker for an additional 96 hours at 28° C. At this time analysis of the mash showed the presence of 85 micrograms per ml. of 7-chloro-6-demethyltetracycline. A control flask run in exactly the same manner but omitting the pretetramid showed no 7-chloro-6-demethyltetracycline.

EXAMPLE 7

*Biological conversion of 6-methylpretetramid to 7-chlorotetracycline utilizing S. aureofaciens NRRL 3013*

Spores of *S. aureofaciens* NRRL 3013 were washed from an agar slant with distilled water to form a suspension containing $60-80 \times 10^6$ spores per ml. A 0.33 ml. portion of this suspension was used to inoculate an 8 inch test tube containing 8 ml. of an inoculum medium prepared and incubated exactly as described in Example 5 whereby an inoculum of the *S. aureofaciens* culture was obtained. A fermentation medium was prepared exactly as described in Example 5. After sterilization of this medium, 25 ml. portions in 250 ml. Erlenmeyer flasks were inoculated with 1 ml. portions of the *S. aureofaciens* inoculum. The fermentation was carried out at 25° C. for 24 hours on a rotary shaker operating at 180 revolutions per minute. At this time each mash portion was transferred to an individual flask containing a solution of 10 milligrams of 6-methylpretetramid in 1 ml. of dimethylsulfoxide which had been made alkaline with ammonium hydroxide. The fermentation was continued on the rotary shaker for an additional 96 hours at 25° C. At this time, biological assays of the mash indicated the presence of antibacterial activity corresponding to 180 micrograms per ml. of 7-chlorotetracycline. The identity of the product as 7-chlorotetracycline was confirmed by paper chromatography in a butanol-pH 3 phosphate buffer system. A control flask run in exactly the same manner but with the addition of only dimethylsulfoxide and no 6-methylpretetramid showed no 7-chlorotetracycline.

EXAMPLE 8

*Biological conversion of 6-methylpretetramid to 7-chlorotetracycline utilizing S. aureofaciens ATCC 10762a*

The procedure of Example 7 was followed with the following exceptions: Spores of *S. aureofaciens* ATCC 10762a were used instead of NRRL 3013. The partially fermented mash was transferred to individual flasks containing a solution of 11 mg. of 6-methylpretetramid in a mixture of 10 mg. of magnesium acetate and 1 ml. of dimethylsulfoxide. The fermentation was then continued on the rotary shaker for an additional 96 hours at 28° C. At this time, analysis of the mash showed the presence of 265 micrograms per ml. of 7-chlorotetracycline. A control flask run in exactly the same manner but omitting the 6-methylpretetramid showed no 7-chlorotetracycline.

EXAMPLE 9

*Biological conversion of 6-methylpretetramid to tetracycline utilizing S. aureofaciens NRRL 3014*

The procedure of Example 8 was followed with the following exceptions: Spores of non-chlorinating *S. aureofaciens* NRRL 3014 were used instead of ATCC 10762a. The partially fermented mash was transferred to flasks containing a solution of 11 mg. of 6-methylpretetramid in a mixture of 10 mg. of magnesium acetate and 1 ml. of dimethylsulfoxide. The fermentation was then continued on the rotary shaker for an additional 96 hours at 28° C. At this time, analysis of the mash showed the presence of 108 micrograms per ml. of tetracycline. A control flask run in exactly the same manner but omitting the 6-methylpretetramid showed no tetracycline.

EXAMPLE 10

*Biological conversion of 6-methylpretetramid to oxytetracycline utilizing S. hygroscopicus NRRL 3015*

The procedure of Example 7 was used with the following exceptions: Spores of a culture isolated from soil and identified as *S. hygroscopicus* NRRL 3015 were used instead of NRRL 3013. The partially fermented mash (fermented at 28° C.) was transferred to flasks containing a solution of 10 mg. of 6-methylpretetramid in a mixture of 10 mg. of magnesium acetate and 1 ml. of dimethylsulfoxide. The fermentation was then continued on the rotary shaker for an additional 96 hours at 34° C. At this time, analysis of the mash showed an enhancement in the amount of oxytetracycline over that in a control flask run in the same manner but omitting the 6-methylpretetramid.

EXAMPLE 11

*Biological conversion of 6-methylpretetramid to oxytetracycline utilizing S. rimosus NRRL 2234*

The procedure of Example 10 was used with the sole exception that spores of *S. rimosus* NRRL 2234 were used instead of *S. hygroscopicus* NRRL 3015. Final analysis of the mash showed an enhancement in the amount of oxytetracycline over that in a control flask run in the same manner but omitting the 6-methylpretetramid.

EXAMPLE 12

*Biological conversion of 4-dimethylamino-6-methylpretetramid to tetracycline utilizing S. aureofaciens NRRL 3014*

Spores of non-chlorinating *S. aureofaciens* NRRL 3014 were washed from an agar slant with sterile distilled water to form a suspension containing $60-80 \times 10^6$ spores per ml. A 0.33 ml. portion of this suspension was used to inoculate in 8 inch test tube containing 8 ml. of an inoculum medium prepared and incubated exactly as described in Example 5 whereby an inoculum of the *S. aureofaciens* culture was obtained. A fermentation medium was prepared exactly as described in Example 5. After sterilization of this medium, 25 ml. portions in 250 ml. Erlenmeyer flasks were inoculated with 1 ml. portions of the *S. aureofaciens* inoculum. The fermentation was carried out at 25° C. for 24 hours on a rotary shaker operating at 180 revolutions per minute. At this time each mash portion was transferred to an individual flask containing a solution of 10 mg. of 4-dimethylamino-6-methylpretetramid in 1 ml. of dimethylsulfoxide. The fermentation was continued on the rotary shaker for an additional 96 hours at 25° C. At this time, biological assays of the mash showed the presence of 25 micrograms per ml. of tetracycline. A control flask run in exactly the same manner but omitting the 4-dimethylamino-6-methylpretetramid showed no tetracycline.

EXAMPLE 13

*Biological conversion of 4-dimethylamino-6-methylpretetramid to 7-chlorotetracycline utilizing S. aureofaciens NRRL 3013*

The procedure of Example 7 was followed with the following exceptions: The partially fermented mash was transferred to individual flasks containing a solution of 10.6 mg. of 4-dimethylamino-6-methylpretetramid in a mixture of 10 mg. of magnesium acetate and 1 ml. of dimethylsulfoxide. The fermentation was then continued on the rotary shaker for an additional 96 hours at 28° C. At this time, analysis of the mash showed the presence of 58 micrograms per ml. of 7-chlorotetracycline. A control flask run in exactly the same manner but omitting the 4 - dimethylamino - 6 - methylpretetramid showed no 7 - chlorotetracycline.

EXAMPLE 14

*Biological conversion of 7 - chloro - 4 - dimethylaminopretetramid to 7 - chloro - 6 - demethyltetracycline utilizing S. aureofaciens NRRL 3013*

Spores of *S. aureofaciens* NRRL 3013 were washed from an agar slant with sterile distilled water to form a suspension containing $60-80 \times 10^6$ spores per ml. A 0.33 ml. portion of this suspension was used to inoculate an 8 inch test tube containing 8 ml. of an inoculum prepared and incubated exactly as described in Example 5 whereby an inoculum of the *S. aureofaciens* culture was obtained. A fermentation medium was prepared exactly as described in Example 5. After sterilization of this medium, 25 ml. portions in 250 ml. Erlenmeyer flasks were inoculated with 1 ml. portions of the *S. aureofaciens* inoculum. The fermentation was carried out at 25° C. for 24 hours on a rotary shaker operating at 180 revolutions per minute. At this time, each mash portion was transferred to an individual flask containing a solution of 10 mg. of 7-chloro-4-dimethylaminopretetramid in 1 ml. of dimethylsulfoxide. The fermentation was continued on the rotary shaker for an additional 96 hours at 25° C. At this time, biological assays of the mash showed the presence of 28 micrograms per ml. of 7-chloro-6-demethyltetracycline. A control flask run in exactly the same manner but omitting the 7-chloro-4-dimethylaminopretetramid showed no 7-chloro-6-demethyltetracycline.

EXAMPLE 15

*Biological conversion of 7-chloro-4-dimethylaminopretetramid to 7-chloro-6-demethyltetracycline utilizing S. aureofaciens NRRL 3014*

The procedure of Example 14 was followed with the following exceptions: Spores of non-chlorinating *S. aureofaciens* NRRL 3014 were used instead of NRRL 3013. The partially fermented mash was transferred to flasks containing a solution of 10 mg. of 7-chloro-4-dimethylaminopretetramid in a mixture of 10 mg. of magnesium acetate and 1 ml. of dimethylsulfoxide. The fermentation was then continued on the rotary shaker for an additional 96 hours at 28° C. At this time analysis of the mash showed the presence of 31 micrograms per ml. of 7-chloro-6-demethyltetracycline. A control flask run in exactly the same manner but omitting the 7-chloro-4-dimethylaminopretetramid showed no 7-chloro-6-demethyltetracycline.

EXAMPLE 16

*Biological conversion of 7-chloro-4-dimethylaminopretetramid to 7-chloro-6-demethyltetracycline utilizing S. aureofaciens NRRL B-2407*

The procedure of Example 14 was followed with the following exceptions: Spores of *S. aureofaciens* NRRL B-2407 were used instead of NRRL 3013. The partially fermented mash was transferred to individual flasks containing a solution of 10.1 mg. of 7-chloro-4-dimethylaminopretetramid in a mixture of 10 mg. of magnesium acetate and 1 ml. of dimethylsulfoxide. The fermentation was then continued on the rotary shaker for an additional 96 hours at 28° C. At this time analysis of the mash showed the presence of 99 micrograms per ml. of antibiotic activity calculated as 7-chlorotetracycline. A paper strip chromatogram showed the presence of 7-chloro-6-demethyltetracycline. A control flask run in exactly the same manner but omitting the 7-chloro-4-dimethylaminopretetramid showed no 7-chloro-6-demethyltetracycline.

EXAMPLE 17

*Biological conversion of 7-chloro-4-dimethylamino-6-methylpretetramid to 7-chlorotetracycline utilizing S. aureofaciens NRRL 3013*

Spores of *S. aureofaciens* NRRL 3013 were washed from an agar slant with sterile distilled water to form a suspension containing 60–80×10$^6$ spores per ml. A 0.33 ml. portion of this suspension was used to inoculate an 8 inch test tube containing 8 ml. of a medium prepared according to the following formulation:

| | Grams |
|---|---|
| Sucrose | 30 |
| Ammonium sulfate | 2 |
| Calcium carbonate | 7 |
| Cornsteep liquor | 20 |
| Tap water, q.s. to 1000 milliliters. | |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute, whereby an inoculum of the *S. aureofaciens* was obtained. A fermentation medium of the following composition was prepared:

| | | |
|---|---|---|
| $(NH_4)_2SO_4$ | grams | 6.7 |
| $CaCO_3$ | do | 9.0 |
| $CoCl_2 \cdot 6H_2O$ | milligrams | 5.0 |
| $NH_4Cl$ | grams | 2.0 |
| $MnSO_4$ (70% technical grade) | do | 0.10 |
| Cornsteep liquor | do | 25.0 |
| Starch | do | 52.5 |
| Corn flour | do | 14.5 |
| Tap water, q.s. to 1000 milliliters. | | |

After sterilization of this medium in an autoclave for 20 minutes at a pressure of 15 pounds per square inch, 25 ml. portions in 250 ml. Erlenmeyer flasks were inoculated with 1.0 ml. portions of the *S. aureofaciens* inoculum. The fermentation was carried out at 28° C. for 24 hours on a rotary shaker operating at 180 revolutions per minute. At this time each mash portion was transferred to an individual flask containing a solution of 9.5 mg. of 7-chloro-4-dimethylamino-6-methylpretetramid in a mixture of 10 mg. of magnesium acetate and 1 ml. of dimethylsulfoxide. The fermentation was then continued on the rotary shaker for an additional 96 hours at 28° C. At this time, analysis of the mash showed the presence of 20 micrograms per ml. of 7-chlorotetracycline. A control flask run in the same manner but omitting the 7-chloro-4-dimethylamino-6-methylpretetramid showed no 7-chlorotetracycline.

EXAMPLE 18

*Synthesis of 7-hydroxypretetramid*

To 264 mg. of 1,3-dihydroxy-5,8-dimethoxynaphthalene-2-carboxamide was added 402 mg. of 3,6-dihydroxyphthalic acid, 2 gm. of sodium chloride and 10 gm. of anhydrous aluminum chloride. The solids were mixed thoroughly in a mortar and added to a flask which was set in an oil bath preheated to 200° C. The reaction was allowed to proceed for 30 minutes. The melt was allowed to cool and was then digested cautiously with 50 ml. of 6 N HCl on a steam bath. The crude 1,3,6,7,10,11-hexahydroxynaphthacene-5,12-quinone-2-carboxamide was collected by filtration, washed and then dried under vacuum. The crude quinone was then purified by extraction with a 1% solution of triethylamine in tetrahydrofuran. The yield was about 358 mg. This purified quinone was dissolved in 5 ml. of p-chlorophenol. To this was added 2 ml. of constant boiling hydriodic acid and 200 mg. of dibasic potassium hypophosphite. This mixture was refluxed for 5 hours, allowed to cool and then filtered. The crystalline 7-hydroxypretetramid was washed with water, acetone and then ether and dried under vacuum. The yield was 147 mg.

EXAMPLE 19

*Synthesis of 7-hydroxypretetramid*

To 269 mg. of 1,3-dihydroxy-5,8-dimethoxynaphthalene-2-carboxamide was added 449 mg. of 3,6-diacetoxyphthalic anhydride, 2 gm. of sodium chloride and 10 gm. of anhydrous aluminum chloride. The procedure of Example 18 was followed resulting in a yield of 20 mg. of the crude quinone which was then reduced to 7-hydroxypretetramid.

EXAMPLE 20

*Biological conversion of 7-hydroxypretetramid to 7-hydroxy-6-dimethyltetracycline utilizing S. aureofaciens NRRL 3013*

The procedure of Example 17 was followed with the following exceptions: The partially fermented mash was transferred to individual flasks containing a solution of 3.95 mg. of 7-hydroxypretetramid in a mixture of 10 mg. of magnesium acetate and 1 ml. of dimethylsulfoxide. The fermentation was then continued on the rotary shaker for an additional 96 hours at 28° C. At this time, analysis of the mash showed the presence of 2.8 micrograms per ml. of antibiotic activity calculated as 7-chlorotetracycline. A control flask run in the same manner but omitting the 7-hydroxypretetramid showed no antibiotic activity.

EXAMPLE 21

*Synthesis of 4-hydroxypretetramid*

A 110 mg. portion of 1,3,4,10,12-pentahydroxynaphthacene - 6,11 - quinone - 2 - carboxamide, prepared as described in Example 7, U.S. Patent No. 3,074,975 (McCormick and Gardner) was added to 5 ml. of phenol, 2.5 ml. of constant boiling hydriodic acid, and 200 mg. of potassium hypophosphite. The mixture was refluxed for 5 minutes, cooled and the crystalline product was filtered off, affording 73 mg. of 4-hydroxypretetramid.

EXAMPLE 22

*Biological conversion of 4-hydroxypretetramid to 7-chloro-6-dimethyltetracycline utilizing S. aureofaciens NRRL 3013*

The procedure of Example 5 was followed with the following exceptions: A partially fermented mash of S. aureofaciens NRRL 3013 was transferred to an individual flask containing a solution of 5.45 mg. of 4-hydroxypretetramid in 30 mg. of magnesium acetate and 1 ml. of dimethylsulfoxide. The fermentation was then continued on the rotary shaker for an additional 72 hours at 28° C. At this time, analysis of the mash showed the presence of 17 micrograms per ml. of 7-chloro-6-demethyltetracycline. A control flask run in exactly the same manner but omitting the 4-hydroxypretetramid showed no 7-chloro-6-demethyltetracycline.

EXAMPLE 23

*Preparation of 4-dedimethylamino-4-hydroxy-4a,12a-anhydrotetracycline*

A 2.0 gram portion of tetracycline methyl betaine was suspended in 500 ml. of acetonitrile. Nitrogen was bubbled through this suspension for 15 minutes. The suspension was then heated under nitrogen atmosphere to the boiling point of acetonitrile and refluxed for 1½ hours. The heat was then removed and the bubbling of nitrogen was continued for an additional 15 minutes until all of the trimethylamine vapors had been stripped off. An orange crystalline product precipitated upon cooling. This precipitate was collected by filtration, washed with acetonitrile and dried in a vacuum desiccator to afford 100 mg. of product.

EXAMPLE 24

*Conversion of 4-dedimethylamino-4-hydroxy-4a,12a-anhydrotetracycline to 6-methyl-1,3,4,10,11,12-hexahydroxynaphthacene-2-carboxamide*

A 100 mg. portion of 4-dedimethylamino-4-hydroxy-4a,12a-anhydrotetracycline was suspended in 15 ml. of a solution of 30% hydrobromic acid in acetic acid. This suspension was heated at 50–55° C. for 3 hours. The suspension was cooled to room temperature and the precipitate was collected by filtration, washed with water and dried in a vacuum desiccator for 16 hours, affording 89 mg. of product.

EXAMPLE 25

*Biological conversion of 6-methyl-1,3,4,10,11,12-hexahydroxynaphthacene-2-carboxamide to 7-chlorotetracycline*

Spores of S. aureofaciens NRRL 3013 were washed from an agar slant with sterile distilled water to form a suspension containing 60 million to 80 million spores per ml. A 0.33 ml. portion of this suspension was used to inoculate an 8 inch test tube containing 8 ml. of an inoculum prepared as described in Example 5. A fermentation medium of the following composition was prepared:

| | | |
|---|---|---|
| $(NH_4)_2SO_4$ | grams | 6.7 |
| $CaCO_3$ | do | 9.0 |
| $CoCl_2 \cdot 6H_2O$ | milligrams | 5.0 |
| $NH_4Cl$ | grams | 2.0 |
| $MnSO_4$ (70% technical grade) | do | 0.10 |
| Cornsteep liquor | do | 25.0 |
| Starch | do | 52.5 |
| Corn flour | do | 14.5 |
| Tap water, q.s. to 1000 milliliters. | | |

After sterilization of this medium, 25 ml. portions in 250 ml. Erlenmeyer flasks were inoculated with 1 ml. portions of the S. aureofaciens NRRL 3013 inoculum. The fermentation was carried out at 28° C. for 24 hours on a rotary shaker operating at 180 revolutions per minute. At this time each mash portion was transferred to an individual flask containing a solution of 10.7 mg. of 6-methyl - 1,3,4,10,11,12 - hexahydroxynaphthacene - 2 - carboxamide in a mixture of 30 mg. of magnesium acetate and 1 ml. of dimethylsulfoxide. The fermentation was continued on the rotary shaker for an additional 96 hours at 28° C. At this time, biological assays of the mash indicated the presence of antibacterial activity corresponding to 264 micrograms of 7-chlorotetracycline per ml. This corresponds to a yield of 49% based on the compound added. The identity of the product as 7-chlorotetracycline was confirmed by paper chromatography in a butanol-pH 3 phosphate buffer system. A control flask run in the same manner but with the addition of only 30 mg. of magnesium acetate and 1 ml. of dimethylsulfoxide and no 6-methyl-1,3,4,10,11,12-hexahydroxynaphthacene-2-carboxamide, showed no 7-chlorotetracycline.

EXAMPLE 26

*Preparation of 6-demethyl-7-chlorotetracycline methiodide*

The 6-demethyl-7-chlorotetracycline free base, 3 g., is dissolved in 60 ml. of hot tetrahydrofuran and the solution is filtered. To the filtrate is added 9 ml. of methyl iodide and the mixture is allowed to stand at room temperature for 6 days. A small amount of amorphous precipitate is filtered, washed with ether and dried to afford 396 mg. of product. The filtrate is diluted with about 200 ml. of ether and the light yellow solid is isolated by filtration. Yield: 3.18 g. This material is crystallized from methanol as follows: The solution of 1 g. of product in 4 ml. of methanol is stirred at room temperature for 10 minutes. Crystalline precipitate is filtered and dried in pistol at 62° C. for two hours. This product has the following properties:

0.1 N HCl $\lambda$ max.=228 m$\mu$ [log $\epsilon$ 4.41], 270 m$\mu$ [log $\epsilon$ 4.14]
373 m$\mu$ [log $\epsilon$ 4.03]

0.1 M borate $\lambda$ max.=225 m$\mu$ [log $\epsilon$ 4.41], 290 m$\mu$ [log $\epsilon$ 4.09]
375 m$\mu$ [log $\epsilon$ 4.20]

EXAMPLE 27

*Preparation of 6-demethyl-7-chlorotetracycline methyl betaine*

The 6-demethyl-7-chlorotetracycline methiodide, 200 mg., is dissolved in 5 ml. of water. The solution is adjusted immediately to pH 6.8 with a few drops of 20% sodium acetate solution. One ml. of methanol is added to get the precipitated solid into solution which is then stirred for 10 minutes at room temperature. Methanol is stripped off under vacuum and the crystalline product which preciptates from water is filtered and dried at 62° C. overnight to afford 143 mg. of product.

EXAMPLE 28

*Preparation of 4-dedimethylamino-4-hydroxy-4a,12a-anhydro-6-demethyl-7-chlorotetracycline*

The 6-demethyl-7-chlorotetracycline betaine, 3 g., is suspended in 500 ml. of acetonitrile and nitrogen is bubbled through for 15 minutes. The suspension is then heated under nitrogen atmosphere to the boiling point of acetonitrile and refluxed for 4 hours. A small amount of solid does not go in solution. Heat is removed and bubbling of nitrogen is continued until most of the trimethylamine vapors are stripped off (about 10 minutes). The undissolved material is filtered. The filtrate is evaporated to dryness to afford 2.1 g. of a mixture which is purified as follows: 1.5 g. of this material is dissolved in 500 ml. of methanol. A yellow product crystallizes out within a few minutes. It is allowed to stand at room temperature for one hour and then filtered. It is washed well with ether and dried in pistol at 62° C. Yield: 381 mg.

0.1 N HCl $\lambda$ max.$=$285 m$\mu$ [log $\epsilon$ 3.86], 400 m$\mu$ [log $\epsilon$ 4.05]

0.1 M borate $\lambda$ max.$=$255 m$\mu$ [log $\epsilon$ 4.20], 458 m$\mu$ [log $\epsilon$ 4.29]

EXAMPLE 29

*Preparation of 7-chloro-1,3,4,10,11,12-hexahydroxynaphthacene-2-carboxamide*

The 4 - dedimethylamino - 4 - hydroxy - 4a,12a-anhydro-6-demethyl-7-chlorotetracycline, 60 mg., is stirred in 4 ml. of a solution of 32% HBr in acetic acid for 5 minutes. It is then evaporated to dryness under vacuum. The residue is received in ether, filtered and dried in vacuo to afford 58 mg. of product analyzing as follows:

Conc. H$_2$SO$_4$/1% borate $\lambda$ max.$=$285 m$\mu$ [log $\epsilon$ 4.22], 318 m$\mu$ [log $\epsilon$ 4.61], 481 m$\mu$ [log $\epsilon$ 4.16], 534 m$\mu$ [log $\epsilon$ 3.96]

EXAMPLE 30

*Preparation of 4-dedimethylamino-4-hydroxy-4a,12a-anhydro-7-chlorotetracycline*

The 7-chlorotetracycline methyl betaine, 3.44 g., is suspended in 630 ml. of acetonitrile and nitrogen is bubbled through for 15 minutes. The suspension is then heated under nitrogen atmosphere to the boiling point of acetonitrile and the resulting solution is refluxed for one and a half hours. Heat is removed and bubbling of nitrogen is continued until most of trimethylamine vapors are stripped off (about 10 minutes). A small amount of solid precipitates out upon cooling which is filtered off. The filtrate is evaporated to dryness. Solid is received in 500 ml. of ether and refluxed for 30 minutes. Undissolved solid is filtered (1.713 g.). Filtrate which contains the desired products is evaporated to dryness (wt.$=$1.192 g.) and purified by partition column chromatography using the system: heptane-ethyl acetate-methanol-water (80–20–17–4). The product is obtained in two tautomeric forms which give the same ultraviolet spectra in 0.1 N HCl as follows:

$\lambda$ max. 250 m$\mu$ [log $\epsilon$ 4.32], 362 m$\mu$ [log $\epsilon$ 3.90]

EXAMPLE 31

*Preparation of 7-chloro-6-methyl-1,3,4,10,11,12-hexahydroxynaphthacene-2-carboxamide*

The 4 - dedimethylamino - 4 - hydroxy - 4a,12a-anhydro-7-chlorotetracycline, 20 mg., is dissolved in 4 ml. of a solution of 32% hydrobromic acid in acetic acid and the red solution is evaporated immediately to dryness under vacuum. The solid is received in ether, filtered and dried in vacuo to afford 16.7 mg. of product analyzing as follows:

$\lambda$ max.$=$270 [log $\epsilon$ 4.32], 310 [log $\epsilon$ 4.39], 508 [log $\epsilon$ 3.98]

The spectrum is taken in concentrated H$_2$SO$_4$ containing 1% sodium borate.

EXAMPLE 32

*Biological conversion of 7-chloro-6-methyl-1,3,4,10,11,12-hexahydroxynaphthacene-2-carboxamide to 7-chlorotetracycline utilizing a non-chlorinating strain of S. aureofaciens*

Spores of non-chlorinating *S. aureofaciens* NRRL 3014 were washed from an agar slant with sterile distilled water to form a suspension containing 60–80$\times$10$^6$ spores per ml. A 0.33 ml. portion of this suspension was used to inoculate an 8 inch test tube containing 8 ml. of a medium prepared according to the following formulation:

|  | Grams |
|---|---|
| Sucrose | 30 |
| Ammonium sulfate | 2 |
| Calcium carbonate | 7 |
| Cornsteep liquor | 20 |
| Tap water, q.s. to 1000 milliliters. | |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute whereby an inoculum of the *S. aureofaciens* was obtained. A fermentation medium of the following composition was prepared:

| | | |
|---|---|---|
| (NH$_4$)$_2$SO$_4$ | grams | 6.7 |
| CaCO$_3$ | do | 9.0 |
| CoCl$_2\cdot$6H$_2$O | milligrams | 5.0 |
| NH$_2$Cl | grams | 2.0 |
| MnSO$_4$ (70% technical grade) | do | 0.10 |
| Cornsteep liquor | do | 25.0 |
| Starch | do | 52.5 |
| Corn flour | do | 14.5 |
| Tap water, q.s. to 1000 milliliters. | | |

After sterilization of this medium in an autoclave for 20 minutes at a pressure of 15 pounds per square inch, 25 ml. portions in 250 ml. Erlenmeyer flasks were inoculated with 1.0 ml. portions of the *S. aureofaciens* inoculum. The fermentation was carried out at 25° C. for 24 hours on a rotary shaker operating at 180 revolutions per minute. At this time each mash portion was transferred to an individual flask containing a solution of 10 mg. of 7-chloro-6-methyl-1,3,4,10,11,12 - hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time analysis of the mash showed the presence of 10 micrograms per ml. of 7-chlorotetracycline. A control flask run in exactly the same manner but omitting the 7-chloro-6-methyl-1,3,4,10,11,12 - hexahydroxynaphthacene - 2 - carboxamide showed no 7-chlorotetracycline.

EXAMPLE 33

*Biological conversion of 7-chloro-1,3,4,10,11,12-hexahydroxynaphthacene-2-carboxamide to 7 - chloro - 6 - demethyltetracycline utilizing a non-chlorinating strain of S. aureofaciens*

The procedure of Example 32 was followed with these exceptions: The partially fermented (24 hour) mash was transferred to flasks containing a solution of 10 mg. of 7-chloro-1,3,4,10,11,12-hexahydroxynaphthacene - 2 - carboxamide in a mixture of 10 mg. of magnesium acetate and 1 ml. of dimethylsulfoxide. The fermentation was then continued on the rotary shaker for an additional 96 hours at 28° C. At this time, analysis of the mash showed the presence of 9 micrograms per ml. of 7-chloro-6-demethyltetracycline. A control flask run in exactly the same manner but omitting the 7-chloro-1,3,4,10,11,12-hexahydroxynaphthacene-2-carboxamide showed no 7-chloro-6-demethyltetracycline.

EXAMPLE 34

*Biological conversion of 7-chloro-6-methyl-1,3,4,10,11, 12-hexahydroxynaphthacene-2-carboxamide to 7-chlorotetracycline utilizing a chlorinating strain of S. aureofaciens*

The procedure of Example 32 was followed with these exceptons: Spores of chlorinating *S. aureofaciens* NRRL 3013 were washed from an agar slant with sterile distilled water to form a suspension containing 60–80×10⁶ spores per ml. A 0.33 ml. portion of this suspension was used to inoculate an 8 inch test tube containing 8 ml. of the medium described in Example 32. The partially fermented (24 hour) mash (prepared as in Example 32) was transferred to flasks containing a solution of 10 mg. of 7-chloro-6-methyl-1,3,4,10,11,12-hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time, analysis of the mash showed the presence of 10 micrograms per ml. of 7-chlorotetracycline. A control flask run in exactly the same manner but omitting the 7-chloro-6-methyl-1,3,4,10,11,12-hexahydroxynaphthacene-2-carboxamide showed no 7-chlorotetracycline.

EXAMPLE 35

*Biological conversion of 7-chloro-1,3,4,10,11,12-hexahydroxynaphthacene-2-carboxamide to 7-chloro-6-demethyltetracycline utilizing a chlorinating strain of S. aureofaciens*

The procedure of Example 34 was followed with these exceptions: The partially fermented (24 hour) mash was transferred to flasks containing a solution of 10 mg. of 7-chloro-1,3,4,10,11,12-hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time analysis of the mash showed the presence of 9 micrograms per ml. of 7-chloro-6-demethyltetracycline. A control flask run in exactly the same manner but omitting the 7-chloro-1,3,4,10,11,12-hexahydroxynaphthacene-2-carboxamide showed no 7-chloro-6-demethyltetracycline.

What is claimed is:

1. A process for the 6,12a-dihydroxylation of a 1,3,10,11,12-pentahydroxynaphthacene-2-carboxamide which comprises adding the 1,3,10,11,12-pentahydroxynaphthacene-2-carboxamide to an aqueous nutrient medium, aerobically fermenting the aqueous nutrient medium with a strain of a tetracyclines-producing species of the genus Streptomyces, and continuing the fermentation until the 1,3,10,11,12-pentahydroxynaphthacene-2-carboxamide is substantially converted to the corresponding tetracycline.

2. A process for the simultaneous 6,12a-dihydroxylation of and introduction of a 4-dimethylamino group into a 4-unsubstituted-1,3,10,11,12-pentahydroxynaphthacene-2-carboxamide which comprises adding the 4-unsubstituted-1,3,10,11,12-pentahydroxynaphthacene-2-carboxamide to an aqueous nutrient medium, aerobically fermenting the aqueous nutrient medium with a strain of a tetracyclines-producing species of the genus Streptomyces, and continuing the fermentation until the 4-unsubstituted-1,3,10,11,12-pentahydroxynaphthacene-2-carboxamide is substantially converted to the corresponding tetracycline.

3. A process for the simultaneous 6,12a-dihydroxylation of and introduction of a 7-halo group and a 4-dimethylamino group into a 4,7-di-unsubstituted-1,3,10,11, 12-pentahydroxynaphthacene-2-carboxamide which comprises adding the 4,7-di-unsubstituted-1,3,10,11,12-pentahydroxynaphthacene-2-carboxamide to an aqueous nutrient medium, aerobically fermenting the aqueous nutrient medium with a strain of a tetracyclines-producing species of the genus Streptomyces, and continung the fermentation until the 4,7-di-unsubstituted-1,3,10,11,12-pentahydroxynaphthacene-2-carboxamide is substantially converted to the corresponding tetracycline.

4. A process of preparing tetracyclines of the formula:

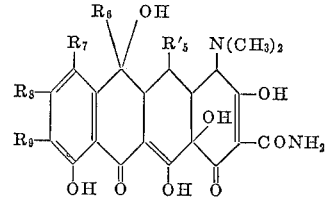

wherein $R'_5$ is selected from the group consisting of hydrogen, hydroxy, lower alkoxy and lower alkyl, $R_6$ is selected from the group consisting of hydrogen and lower alkyl, and $R_7$, $R_8$ and $R_9$ are each selected from the group consisting of hydrogen, halogen, hydroxy, lower alkoxy, lower alkyl, nitroso, nitro, amino, mono(lower alkyl)amino, di(lower alkyl)amino, thiocyano and mercapto; which comprises adding a pretetramid of the formula:

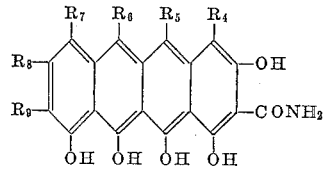

wherein $R_4$ is selected from the group consisting of hydrogen, hydroxy and dimethylamino, $R_5$ is selected from the group consisting of hydrogen, lower alkoxy and lower alkyl, $R_6$ is selected from the group consisting of hydrogen and lower alkyl, and $R_7$, $R_8$ and $R_9$ are each selected from the group consisting of hydrogen, halogen, hydroxy, lower alkoxy, lower alkyl, nitroso, nitro, amino, mono(lower alkyl)amino, di(lower alkyl)amino, thiocyano and mercapto; to an aqueous nutrient medium, aerobically fermenting the aqueous nutrient medium with a strain of a tetracyclines-producing species of the genus Streptomyces, and continuing the fermentation until the pretetramid is substantially converted to the corresponding tetracycline.

5. A process of preparing tetracyclines of the formula:

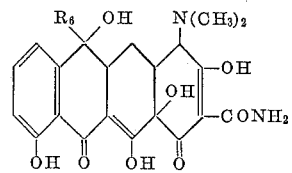

wherein $R_6$ is selected from the group consisting of hydrogen and lower alkyl; which comprises adding a pretetramid of the formula:

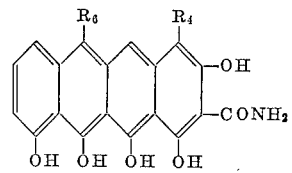

wherein $R_4$ is selected from the group consisting of hydrogen, hydroxy and dimethylamino, and $R_6$ is selected from the group consisting of hydrogen and lower alkyl; to an aqueous nutrient medium, aerobically fermenting the aqueous nutrient medium with a non-7-halogenating strain of a tetracyclines-producing species of the genus Streptomyces, and continuing the fermentation until the pretetramid is substantially converted to the corresponding tetracycline.

6. A process of preparing tetracyclines of the formula:

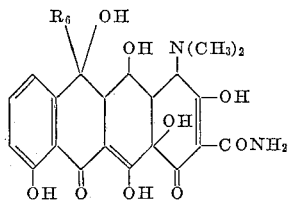

wherein $R_6$ is selected from the group consisting of hydrogen and lower alkyl; which comprises adding a pretetramid of the formula:

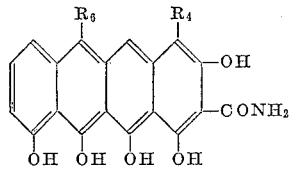

wherein $R_4$ is selected from the group consisting of hydrogen, hydroxy and dimethylamino, and $R_6$ is selected from the group consisting of hydrogen and lower alkyl, to an aqueous nutrient medium, aerobically fermenting the aqueous nutrient medium with a 5-hydroxylating strain of a tetracyclines-producing species of the genus Streptomyces, and continuing the fermentation until the pretetramid is substantially converted to the corresponding tetracycline.

7. A process of preparing tetracyclines of the formula:

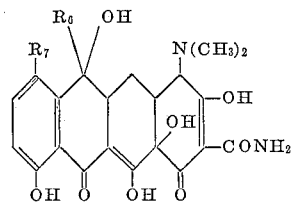

wherein $R_6$ is selected from the group consisting of hydrogen and lower alkyl, and $R_7$ is halogen; which comprises adding a pretetramid of the formula:

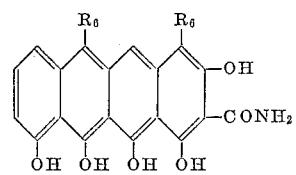

wherein $R_4$ is selected from the group consisting of hydrogen, hydroxy and dimethylamino, and $R_6$ is selected from the group consisting of hydrogen and lower alkyl; to an aqueous nutrient medium, aerobically fermenting the aqueous nutrient medium with a 7-halogenating strain of a tetracyclines-producing species of the genus Streptomyces, and continuing the fermentation until the pretetramid is substantially converted to the corresponding tetracycline.

8. A process of preparing tetracyclines of the formula:

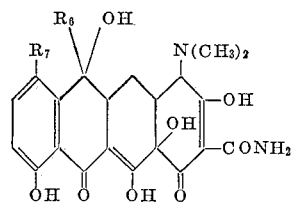

wherein $R_6$ is selected from the group consisting of hydrogen and lower alkyl, and $R_7$ is halogen; which comprises adding a pretetramid of the formula:

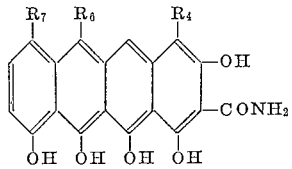

wherein $R_4$ is selected from the group consisting of hydrogen, hydroxy and dimethylamino, $R_6$ is selected from the group consisting of hydrogen and lower alkyl, and $R_7$ is as hereinabove defined; to an aqueous nutrient medium, aerobically fermenting the aqueous nutrient medium with a strain of a tetracyclines-producing species of the genus Streptomyces, and continuing the fermentation until the pretetramid is substantially converted to the corresponding tetracycline.

9. A process of preparing 6-demethyltetracycline which comprises adding 1,3,10,11,12-pentahydroxynaphthacene-2-carboxamide to an aqueous nutrient medium, aerobically fermenting the aqueous nutrient medium with a non-7-halogenating strain of a tetracyclines-producing species of the genus Streptomyces, and continuing the fermentation until the 1,3,10,11,12 - pentahydroxynaphthacene-2-carboxamide is substantially converted to 6-demethyltetracycline.

10. A process of preparing 7-chloro-6-demethyltetracycline which comprises adding 1,3,10,11,12-pentahydroxynaphthacene-2-carboxamide to an aqueous nutrient medium, aerobically fermentng the aqueous nutrient medium with a 7-halogenating strain of a tetracyclines-producing species of the genus Streptomyces, and continuing the fermentation until the 1,3,10,11,12-pentahydroxynaphthacene-2-carboxamide is substantially converted to 7-chloro-6-demethyltetracycline.

11. A process of preparing 7-chloro-6-demethyltetracycline which comprises adding 1,3,4,10,11,12-hexahydroxynaphthacene-2-carboxamide to an aqueous nutrient medium, aerobically fermenting the aqueous nutrient medium with a 7-halogenating strain of a tetracyclines-producing species of the genus Stretptomyces, and continuing the fermentation until the 1,3,4,10,11,12-hexahydroxynaphthacene-2-carboxamide is substantially converted to 7-chloro-6-demethyltetracycline.

12. A process of preparing 5-hydroxytetracycline which comprises adding 6 - methyl - 1,3,10,11,12 - pentahydroxynaphthacene-2-carboxamide to an aqueous nutrient medium, aerobically fermenting the aqueous nutrient medium with a 5-hydroxylating strain of a tetracyclines-producing species of the genus Streptomyces, and continuing the fermentation until the 6-methyl-1,3,10,11,12-pentahydroxynaphthacene-2-carboxamide is substantially converted to 5-hydroxytetracycline.

13. A process of preparing 7-hydroxy-6-demethyltetracycline which comprises adding 1,3,7,10,11,12-hexahydroxynaphthacene-2-carboxamide to an aqueous nutrient medium, aerobically fermenting the aqueous nutrient medium with a strain of a tetracyclines-producing species of the genus Streptomyces, and continuing the fermentation until the 1,3,7,10,11,12-hexahydroxynaphthacene-2-carboxamide is substantially converted to 7-hydroxy-6-demethyltetracycline.

14. A process of preparing tetracycline which comprises adding 4 - dimethylamino-6-methyl - 1,3,10,11,12 - pentahydroxynaphthacene-2-carboxamide to an aqueous nutrient medium, aerobically fermenting the aqueous nutrient medium with a non-7-halogenating strain of a tetracyclines-producing species of the genus Streptomyces, and continuing the fermentation until the 4-dimethylamino-6-methyl - 1,3,10,11,12 - pentahydroxynaphthacene - 2 - carboxamide is substantially converted to tetracycline.

15. A process of preparing 7-chlorotetracycline which comprises adding 4-dimethylamino-6-methyl-1,3,10,11,12-pentahydroxynaphthacene-2-carboxamide to an aqueous nutrient medium, aerobically fermenting the aqueous nutrient medium with a 7-halogenating strain of a tetracyclines-producing species of the genus Streptomyces, and continuing the fermentation until the 4-dimethylamino-6-methyl-1,3,10,11,12-pentahydroxynaphthacene-2-carboxamide is substantially converted to 7-chlorotetracycline.

16. A process of preparing 7-chloro-6-demethyltetracycline which comprises adding 7-chloro-4-dimethylamino-1,3,10,11,12-pentahydroxynaphthacene-2-carboxamide to an aqueous nutrient medium, aerobically fermenting the aqueous nutrient medium with a strain of a tetracyclines-producing species of the genus Streptomyces, and continuing the fermentation until the 7-chloro-4-dimethylamino-1,3,10,11,12-pentahydroxynaphthacene-2-carboxamide is substantially converted to 7-chloro-6-demethyltetracycline.

17. A process of preparing 7-chlorotetracycline which comprises adding 7-chloro-4-dimethylamino-6-methyl-1,3,10,11,12-pentahydroxynaphthacene-2-carboxamide to an aqueous nutrient medium, aerobically fermenting the aqueous nutrient medium with a strain of a tetracyclines-producing species of the genus Streptomyces, and continuing the fermentation until the 7-chloro-4-dimethylamino-6-methyl-1,3,10,11,12-pentahydroxynaphthacene-2-carboxamide is substantially converted to 7-chlorotetracycline.

18. A process of preparing 7-chlorotetracycline which comprises adding 6-methyl-1,3,4,10,11,12-hexahydroxynaphthacene-2-carboxamide to an aqueous nutrient medium, aerobically fermenting the aqueous nutrient medium with a 7-halogenating strain of a tetracyclines-producing species of the genus Streptomyces, and continuing the fermentation until the 6-methyl-1,3,4,10,11,12-hexahydroxynaphthacene-2-carboxamide is substantially converted to 7-chlorotetracycline.

19. A process of preparing 7-chlorotetracycline which comprises adding 7-chloro-6-methyl-1,3,4,10,11,12-hexahydroxynaphthacene-2-carboxamide to an aqueous nutrient medium, aerobically fermenting the aqueous nutrient medium with a strain of a tetracyclines-producing species of the genus Streptomyces, and continuing the fermentation until the 7-chloro-6-methyl-1,3,4,10,11,12-hexahydroxynaphthacene-2-carboxamide is substantially converted to 7-chlorotetracycline.

20. A process of preparing 7-chloro-6-demethyltetracycline which comprises adding 7-chloro-1,3,4,10,11,12-hexahydroxynaphthacene-2-carboxamide to an aqueous nutrient medium, aerobically fermenting the aqueous nutrient medium with a strain of a tetracyclines-producing species of the genus Streptomyces, and continuing the fermentation until the 7-chloro-1,3,4,10,11,12-hexahydroxynaphthacene-2-carboxamide is substantially converted to 7-chloro-6-demethyltetracycline.

References Cited by the Examiner
UNITED STATES PATENTS 2,970,087  1/1961  Beck et al. _____ 195—80
3,007,965  11/1961  Growich et al. _____ 195—80 X A. LOUIS MONACELL, *Primary Examiner.*